Feb. 14, 1967         E. LANGECKER         3,304,357
METHOD OF FORMING A BLANK OF THERMO-PLASTIC MATERIAL
Filed March 29, 1963         5 Sheets-Sheet 2
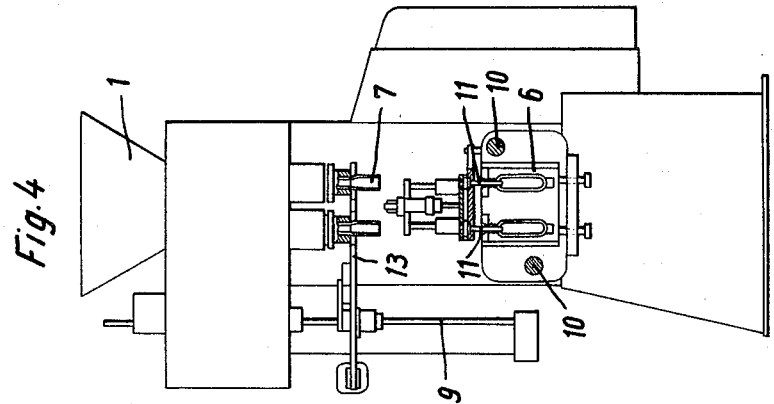
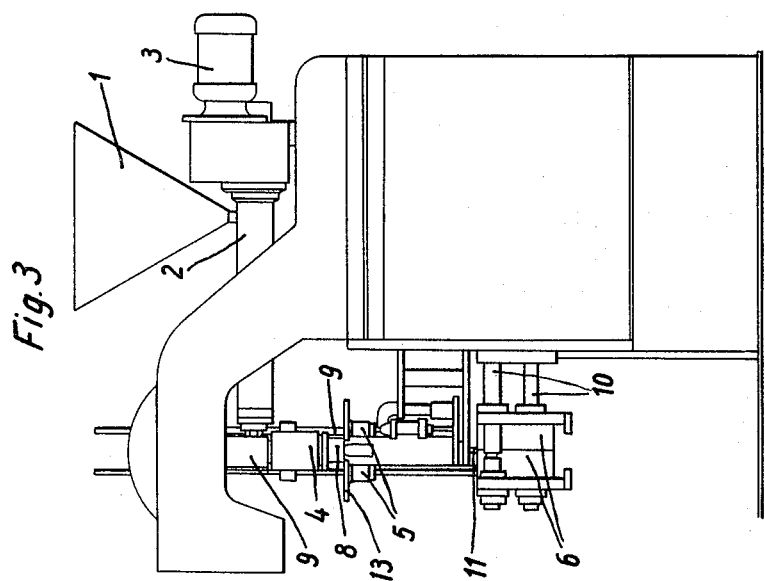
Inventor:
E. Langecker
By Watson Cole Grindle & Watson
Attys.

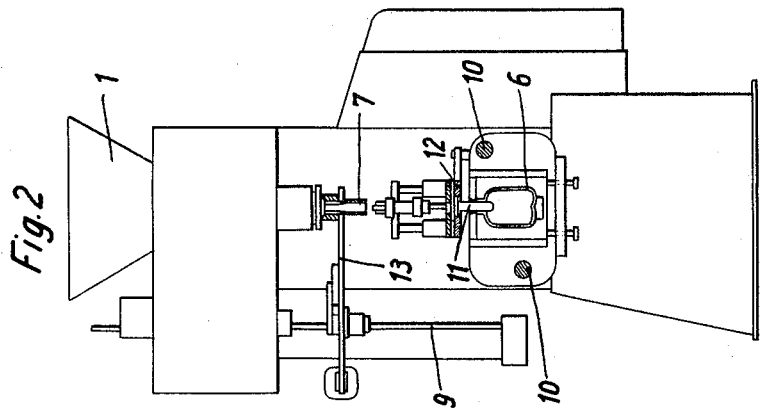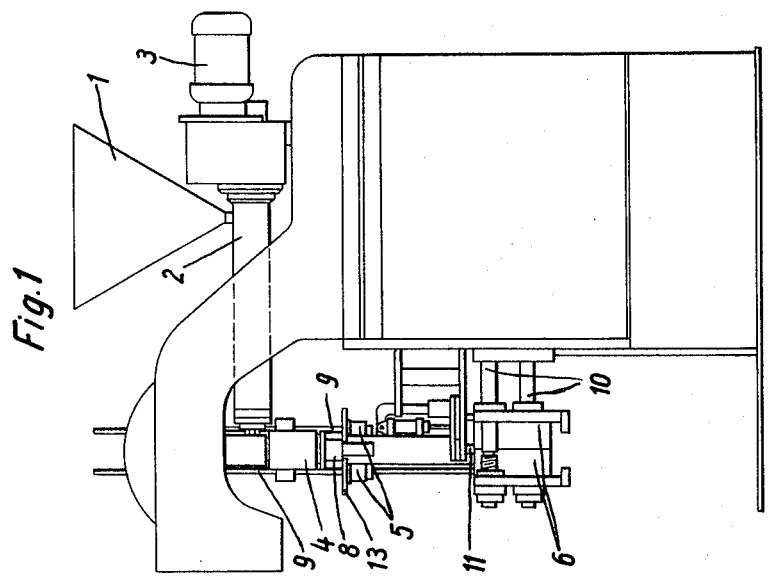

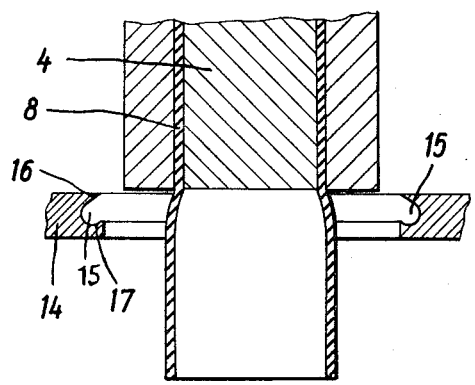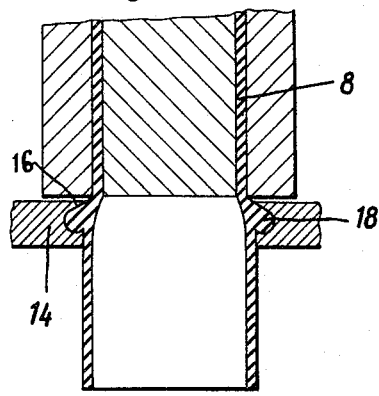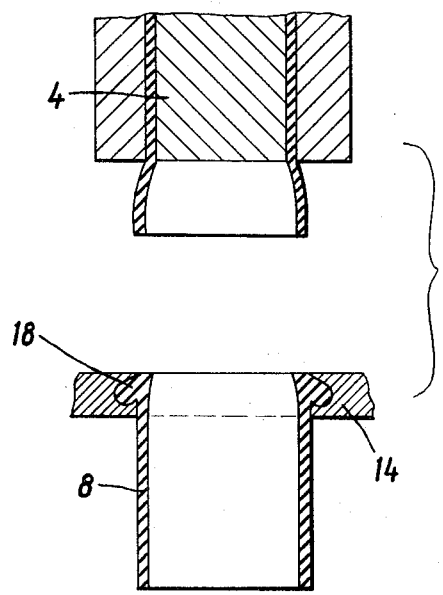

Feb. 14, 1967 E. LANGECKER 3,304,357
METHOD OF FORMING A BLANK OF THERMO-PLASTIC MATERIAL
Filed March 29, 1963 5 Sheets-Sheet 4
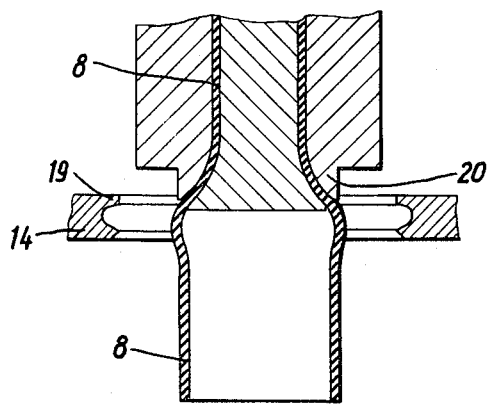
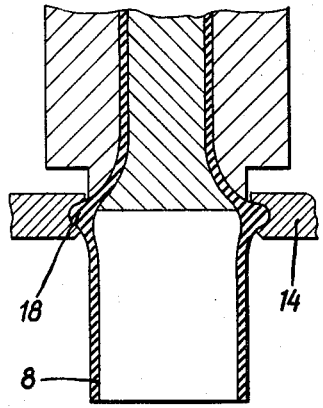
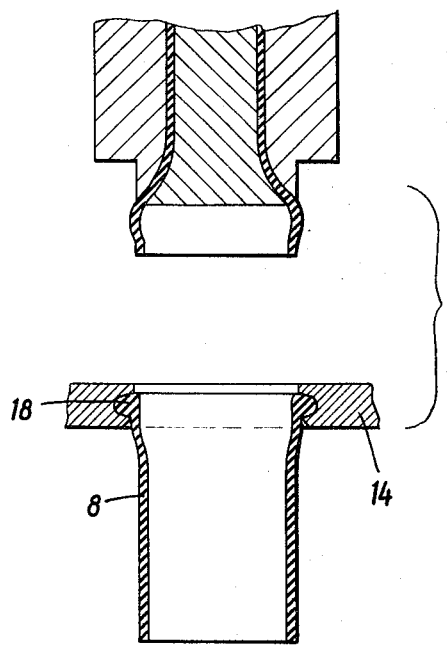
Inventor:
E. Langecker Feb. 14, 1967  E. LANGECKER  3,304,357
METHOD OF FORMING A BLANK OF THERMO-PLASTIC MATERIAL
Filed March 29, 1963  5 Sheets-Sheet 5

Inventor:
E. Langecker
By Watson Cole Grindle + Watson
Attys.

3,304,357
METHOD OF FORMING A BLANK OF THERMO-PLASTIC MATERIAL
Erhard Langecker, Oststrasse 32, Meinerzhagen, Germany
Filed Mar. 29, 1963, Ser. No. 268,963
Claims priority, application Germany, Nov. 9, 1962,
L 43,420
1 Claim. (Cl. 264—150)

This invention relates to a method for forming a blank of thermoplastic material and separating the blank to then guide it into a mold.

It is known in the case of automatic injection apparatus to express or extrude a blank from the spraying nozzle, seize it with a shears or gripping device and conduct it downward or sidewise into a hollow mold. In the known arrangements the blank projecting from the spraying nozzle is clamped by the gripper jaws and in part torn off from the nozzle and further conveyed. This method of course offered no difficulties of any kind in the working of polyethylene, for example, and when it was a question of making hollow bodies with a small diameter and thick tube wall; however, in the case of materials which do not permit a smooth tearing off, that is in cutting off from the nozzle or in the working of tubes of great diameter in comparison with the wall thickness, this was not the case. Also, it was impossible in the known processes to keep the two ends of a tube open to full inside width at the point of separation or gripping. When in the known processes for the purpose of cutting off the blank, a knife is used which is moved past directly below the nozzle to separate the tube, usually the separated piece of tubing is closed at the top, also by the knife gliding past over the outlet opening, the outlet opening may be smeared.

The invention is therefore based on a process for conveying a blank of thermo-plastic material away from the spraying nozzle, wherein a blank sprayed out of the nozzle is seized by a gripper directly at the spraying nozzle end, removed from the latter and conveyed.

In the operation of the gripper arrangement, the expansion of the tube, that is the increase in diameter after leaving the nozzle is utilized, and the resultant flange on the tube which reinforces it directly under the nozzle makes possible a dependable tearing off and prevents an internal collapse.

A still further object of the invention is that it is not only applicable to the making of hollow bodies from tubular blanks but also to the making of other blanks, for example bands, as well as generally for the conveying further of sprayed out blanks independently of their further working or the purpose for which they are to be used.

Also, the process may be employed in the case of machines which work with one spraying nozzle and also a plurality of molds and with several spraying nozzles and a plurality of molds. In each case, by the construction of the gripper arrangement a lateral oscillation of the separated blank is avoided such as is possible otherwise with cutting motions transverse to the axis of exit.

Further objects will be apparent from the following description when considered in connection with the accompanying drawings in which:

FIG. 1 is a side elevation of a plastic molding machine according to the invention and showing one extrusion nozzle;

FIG. 2 is an end elevation of the machine of FIG. 1;

FIG. 3 is a side elevation of a plastic molding machine modified to include two extrusion nozzles;

FIG. 4 is an end elevation of the machine of FIG. 3;

FIG. 5 is a vertical section of the lower part of an extrusion nozzle with open gripper device and showing a part of the extruded tube;

FIG. 6 is similar to FIG. 5, showing the gripper device closed and the tube further extruded;

FIG. 7 is a vertical section similar to FIGS. 5 and 6, showing the severed tube and gripper device moved downwardly and a further portion of an extruded tube;

FIG. 8 is similar to FIG. 5, showing a vertical section of a modified nozzle provided with conical shaping surfaces;

FIG. 9 is a vertical section of the modified nozzle of FIG. 8, with the gripper device closed and the tube further extruded;

FIG. 10 is a vertical section of the modified structure of FIGS. 8 and 9, showing the severed tube and gripper device moved downwardly and a further portion of an extruded tube;

Figure 11:
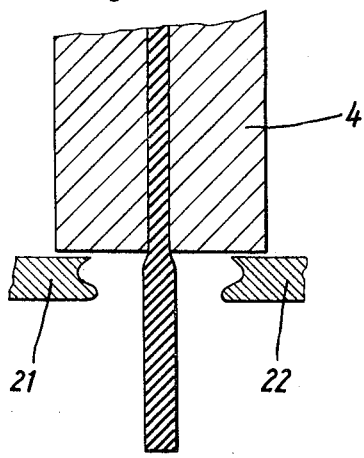
FIG. 11 is a vertical section of the lower part of a modified extrusion nozzle showing an extruded band-like blank with open gripper device.

The machine of FIGS. 1 and 2 includes a funnel 1 in which the powder or granular material is dumped and collected and from which material is fed into an extruder 2 which is driven by a motor 3. The material is transformed into a plastic state in the extruder 2 and is urged then toward the extrusion nozzle to be extruded or pressed from the extrusion head 4. The extruded material issues as a tube to be gripped by a gripper device 5 which, as well be described, will remove the tube from the nozzle head to be guided then into a two-part mold 6. The extrusion nozzle is shown at 8 and the gripper 13 is guided on a slide track or bars 9 in reciprocating motion. The means for operating the reciprocating motions of the grippers, as well as the mechanism for opening and closing the mold, are not illustrated as they are well known. The mold is guided and supported on bars 10 and the blow core or bolt is indicated at 11 carried by the carrier 12. The blow core 11 swings laterally over the mold, after the cut-off tube is lowered so that the blow core may force fluid into the tube in the mold.

FIG. 2 shows the tube expanded in the mold as blown up by the blow core. FIGS. 3 and 4 show a machine in which two molds and blow cores are provided and corresponding parts are indicated by like reference numerals. In FIG. 4 the two blow cores 11 are mounted on a common carrier 12. The legs or shanks of the tongs-like grippers are indicated at 13.

Figure 14:
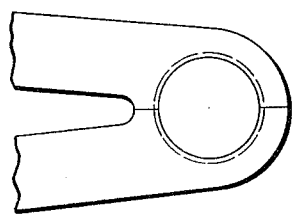
FIG. 14 is a plan view of a portion of a gripper device for a machine for extruding a single tube.
Figure 15:
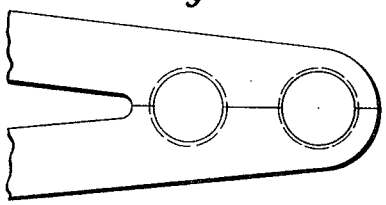
FIG. 15 is a plan view of a portion of a modified gripper device for a machine for extruding two tubes simultaneously.

FIG. 5 shows the nozzle head 4 with a circular extrusion opening and it will be seen that the extruded tube issues from the nozzle in a somewhat greater diameter just after the nozzle tip. This enlargement of the diameter can be advantageously employed in order to render it easier to provide the peripheral upper edge with a flange by means of the grippers 14 to form the flange 18. The grippers have ring-shaped jaws as shown in FIGS. 14 and 15 for one and two tubes respectively.

FIG. 5 shows in cross section the ring-shaped gripper parts having a depressed part 15 to form the flange 18 and a sharp edge 16 is provided on the upper end and a somewhat horizontal portion 17 at the lower end having a vertical or somewhat inclined end face, as clearly seen in FIG. 5. When the tube is cut from the nozzle end the gripper 14 will be close against the bottom surface of the nozzle 4 and the operation is carried out as shown in FIG. 6, whereby the sharp edge 16 of the gripper jaws will be held close against the bottom surface of the nozzle and in engagement with the tube and the enlargement of the diameter of the tube will cause friction and a braking of the tube at this point due to the ring-shaped part 17 and the further flow of the material will push into the spaces 15 of the grippers to form the flange, which in FIG. 6 is identified at 18. The tube due to the formation of the flange, will be held fast in the gripper 14 and will be separated from the tube and nozzle as shown in FIG. 7. The latter figure shows the gripper 14 with the separated tube 8 suspended therefrom and a further part of the next tube section is already suspended from the nozzle head.

FIGS. 8 to 10 show a modification in which the nozzle at its issue or outlet end has a widening or funnel-shaped configuration so that thus the upper ring-shaped part 19 of the gripper jaws will not have a sharp edge but a flat ring-shaped formation and this will cooperate with the projecting collar 20 of the nozzle head, whereby the flange will have a formation as shown in FIG. 9. FIG. 10 again shows the nozzle and grippers separated from each other, such as after the tube has been separated from the nozzle head and the flange 18 has been formed.

Figure 12:
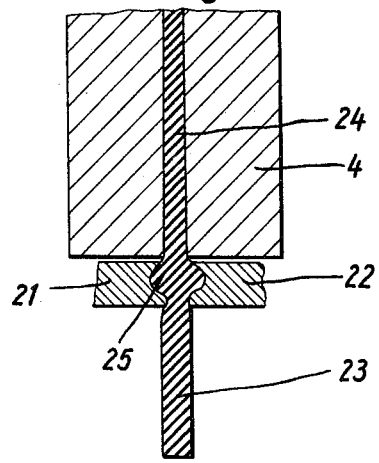
FIG. 12 is a vertical section of the nozzle and gripper device of FIG. 11 with the gripper device in closed position.
Figure 13:
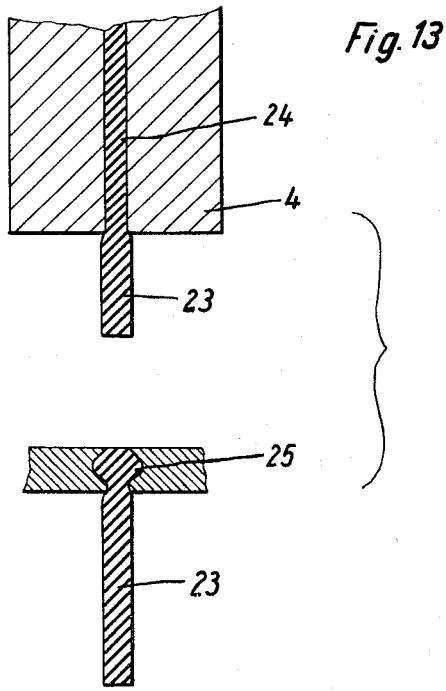
FIG. 13 is a vertical section of the modified structure of FIGS. 11 and 12, showing the severed band and the gripper device moved downwardly and a further portion of extruded band.

FIGS. 11 to 13 show a form of the invention in which a band is extruded and is formed with a flanged end. FIG. 11 shows the extruded band which at the end of the nozzle 4 shows the band with a greater thickness, as compared with the thickness of the band in the nozzle, due to the natural swelling of the material. The gripper jaws must in this case have straight faces which must be parallel to cooperate with the parallel surfaces of the extruded band. The profile of the straight jaw faces may have the same configuration as that of the ring-shaped jaw faces described above and as shown on the drawings. The two gripper jaws 21 and 22 will engage the swelled extruded portion 23 of the tube, which will be thicker than the band section 24 in the nozzle, and form a configuration of the band as shown in FIGS. 12 and 13, with the lower section 23 of the band headed by an enlarged flange-like part 25, formed in the depressed parts 15. Thus, the band section 23 as shown in the lower part of FIG. 13, will have the flange 25 at the upper edge thereof.

The opening and closing of the gripper jaws can be carried out in any desired manner such as by arms 13 as shown in FIGS. 1 to 4, and this can be accomplished by mechanical, hydraulic or pneumatic driving media. Also, any other means may be employed to open and close and move the gripper jaws up and down.

A suitable embodiment for reciprocating the grippers and for opening and closing them, as also for opening and closing the mold is fully disclosed in my prior Patent No. 2,978,745. This patent also discloses that the tube is only weakened by the grippers while they are at rest against the extrusion nozzle.

It is essential that all the parts of the gripper device engaging the tube shall be as large or larger than the largest dimension of the exit end of the nozzle so that there shall be no contraction of the tube at its upper end, and the difference of the dimension of the upper opening of the gripper jaws relative to the lower opening of the gripper jaws must be so formed that the friction set up shall be sufficient to hinder the free movement of the tube but without thus squeezing the tube that its inner diameter becomes smaller than it is at the nozzle opening.

After the gripper jaws are closed and the hollow or depressed part 15 of jaws is filled, the tube portion held by the gripper and already weakened by the sharp ends 16 of the gripper jaws may be torn off from the remaining part of the tube by the following downward movement of the gripper.

The time during which the material must continue to be extruded while the grippers are closed and are at rest against the extrusion nozzle, without the tube continuing to project from the gripper, but the material being pressed into the hollow or depressed part 15 of the gripper jaws until this part is completely filled must be adapted to the respective conditions. Therefore this time may be adjusted as desired by means of any suitable means, e.g. a time switch, or a controlling roller provided with cams adapted to operate means for closing the grippers and to move them downwardly, e.g. as described in my prior above cited patent.

I claim:

A method for conveying a hose-shaped or cord-shaped unworked piece extruded from a nozzle away from said nozzle, comprising surrounding the extruded unworked piece near its edge by a gripping device at the nozzle in the form of a bulge-like bead, the gripping device in its closed position enveloping the unworked piece without narrowing down its cross section extruding from the nozzle and, at an uninterrupted continuation of the extrusion step held in closed rest position during a time period at the nozzle until the bulge-shaped recess of the gripping device is filled by the extruded material, and separating the unworked piece from the nozzle subsequently at the continuation of the extrusion step and transferring the piece by the gripping device into a mold.

References Cited by the Examiner

UNITED STATES PATENTS

| | | | |
|---|---|---|---|
| 2,978,745 | 4/1961 | Langecker | 264—99 |
| 3,000,050 | 9/1961 | Schaich | 264—97 |

ROBERT F. WHITE, *Primary Examiner.*

ALEXANDER H. BRODMERKEL, *Examiner.*

A. R. NOE, *Assistant Examiner.*